United States Patent
Baba et al.

(10) Patent No.: US 6,294,636 B1
(45) Date of Patent: Sep. 25, 2001

(54) SILICONE RUBBER COMPOSITION

(75) Inventors: Katsuya Baba; Kazuo Hirai; Takao Matsushita, all of Chiba Prefecture (JP)

(73) Assignee: Dow Corning Toray Silicone Company, Ltd., Tokyo (JP)

( * ) Notice: Subject to any disclaimer, the term of this patent is extended or adjusted under 35 U.S.C. 154(b) by 0 days.

(21) Appl. No.: 09/258,727

(22) Filed: Feb. 26, 1999

(30) Foreign Application Priority Data

Feb. 26, 1998 (JP) .................................................. 10-062078

(51) Int. Cl.$^7$ ............................ C08G 77/08; C08G 77/06
(52) U.S. Cl. ............................ 528/24; 524/493; 524/847; 524/860
(58) Field of Search .................................. 524/493, 847, 524/860; 528/24

(56) References Cited

U.S. PATENT DOCUMENTS

| | | | |
|---|---|---|---|
| 2,838,472 | * 6/1958 | Lucas . | |
| 4,260,536 | 4/1981 | Yonezawa et al. | ..................... 260/37 |
| 4,743,671 | 5/1988 | Dorn et al. | .............................. 528/24 |
| 5,916,940 | * 6/1999 | Hirai et al. | ............................. 524/301 |
| 5,973,058 | * 10/1999 | Baba et al. | ............................ 524/493 |
| 6,011,105 | * 1/2000 | Ota et al. | ............................... 524/494 |

FOREIGN PATENT DOCUMENTS

| | | | |
|---|---|---|---|
| 0 274 763 | 1/1987 | (EP) | ............................... C08L/83/04 |
| 0 239 961 | 10/1987 | (EP) | ............................... C08L/83/07 |
| 0239961 | 10/1987 | (EP) . | |
| 0 839 860 | 5/1998 | (EP) | ................................ C08K/5/14 |
| 0 899 305 | 3/1999 | (EP) | ............................... C08L/83/07 |
| 59-018758 | 1/1984 | (JP) . | |

OTHER PUBLICATIONS

Chemical Abstracts, vol. 128, No. 10, p. 664, (1998); "Silicone Rubber Compositions for Electric Wire Coatings."

* cited by examiner

Primary Examiner—Robert Dawson
Assistant Examiner—Jeffrey B. Robertson
(74) Attorney, Agent, or Firm—Jennifer S. Warren; William F. Boley

(57) ABSTRACT

A silicone rubber composition, comprising: (A) an polyorganosiloxane gum represented by the following average structural formula: $R_a SiO_{(4-a)/2}$ (where R is a substituted or non-substituted monovalent hydrocarbon, and a is a number between 1.8 and 2.3); (B) microparticulate silica; and (C) a methyl-substituted benzoyl peroxide having the maximum grain diameter not exceeding 50 $\mu$m and an average grain diameter of 30 $\mu$m. When cured, the silicone rubber composition has reduced nonuniformity in the physical properties because of fewer voids, resulting in decreased frequency of spark-outs in the insulated wires.

13 Claims, No Drawings

SILICONE RUBBER COMPOSITION

FIELD OF THE INVENTION

The present invention relates to a silicone rubber composition and to a method for manufacturing products formed from the silicone rubber composition. More specifically, the invention relates to a silicone rubber composition suitable for forming tubes, sheets, electric coating materials, or similar extruded products, as well as to a method for manufacturing products formed from the silicone rubber composition.

BACKGROUND OF THE INVENTION

Silicone rubber is frequently used for the extrusion molding of tube, tape, sheet, wire and cable coatings, and the like because silicone rubber offer an excellent heat resistance, cold resistance, weathering resistance, and electrical characteristics. 2,4-Dichlorobenzoyl peroxide, orthochlorobenzoyl peroxide, and similar chlorinated benzoyl peroxides have been used as a curing agents for curing silicone rubber compositions used as the feedstock in these extrusion molding applications. However, various problems are associated with silicone rubber compositions that contain these chlorinated benzoyl peroxides: they evolve an unpleasant odor when cured, their cure yields moldings that have a sticky, or tacky surface, and blooming occurs onto the surface of their silicone rubber moldings. Blooming is the phenomenon of whitening of the surface as a result of gradual deposition of decomposition products of the curing agent on the surface of the molded product.

Japanese Patent Application 59-18758 teaches a solution to the above problems by using bis-(ortho-methylbenzoyl) peroxide as a curing agent. Japanese Application 62-185750 teaches a method in which a curing agent is bis-(para-methylbenzoyl) peroxide. However, in the course of curing, silicone rubber compositions which contain the aforementioned methyl-substituted benzoyl peroxides as curing agents, are subject to the formation of voids. This often produces a product formed from such silicone rubber that is has non-uniform physical properties, or causes spark-outs of insulated wires or a decrease in voltage required for insulation breakdown.

It is an object of the present invention to provide a silicone rubber composition which has significantly reduced deviations in the physical properties caused by voids in the products formed from the silicone rubber, as well by significantly reduced spark-outs of insulated wires and little decrease in voltage required for insulation breakdown.

SUMMARY OF THE INVENTION

The present invention is a curable composition comprising:

(A) 100 parts by weight of a polyorganosiloxane gum;
(B) 10 to 100 parts by weight of microparticulate silica; and
(C) 0.05 to 10 parts by weight of a methyl-substituted benzoyl peroxide having an average diameter of particles less than or equal to about 30 $\mu$m and a maximum diameter of particles less than or equal to about 60 $\mu$m. When extruded and cured, the resulting silicone rubber has significantly reduced deviations in the physical properties caused by voids in the products formed from the silicone rubber, as well by significantly reduced spark-outs of insulated wires and little decrease in voltage required for insulation breakdown.

DETAILED DESCRIPTION OF THE INVENTION

The present invention is a silicone rubber composition comprising:

(A) 100 parts by weight of a polyorganosiloxane gum represented by the following average structural formula: $R_aSiO_{(4-a)/2}$ (where R is a substituted or non-substituted monovalent hydrocarbon, and a is a number between 1.8 and 2.3);
(B) 10 to 100 parts by weight of microparticulate silica; and
(C) 0.05 to 10 parts by weight of a methyl-substituted benzoyl peroxide having an average diameter of particles less than or equal to about 30 $\mu$m and a maximum diameter of particles less than or equal to about 60 $\mu$m.

Component (A), a polyorganosiloxane gum, is the main component of the present composition and is represented by the following average structural formula: $R_aSiO_{(4-a)/2}$, where R is a substituted or non-substituted monovalent hydrocarbon, which is represented by the following specific examples: a methyl group, an ethyl group, a propyl group, or a similar alkyl group, a cyclohexyl group such as cycloalkyl group; a vinyl group, an allyl group, a butynyl group, a hexenyl group, or a similar alkenyl group; a phenyl group, a tolyl group, or a similar aryl group; a 3,3,3-trifluoropropyl group, a 2-phenylethyl group, a 2-cyanoethyl group, or a similar substituted hydrocarbon group. In the above formula, a is a number between 1.8 and 2.3. It is preferable that Component (A) have a linear molecular structure, however, a partially-branched structure is acceptable. Component (A) may have a degree of polymerization within the range suitable for use in connection with conventional polyorganosiloxane gums known in the art. Normally, Component (A) has a viscosity exceeding $1 \times 10^6$ mPa·s at 25° C. and a number average molecular weight exceeding $25 \times 10^4$.

Component (B), a microparticulate silica, is used for imparting improved mechanical properties to a silicone rubber obtained by curing the composition. Such a microparticulate silica may be a fumed silica or a similar dry-process silica, or a precipitation silica or a similar wet-process silica. The microparticulate silica may have a surface which has been subjected to hydrophobic treatment with organochlorosilane, hexaorganodisilazane, diorganocyclopolysiloxane, or a similar organic silicon compound. Preferably, Component (B) has a specific surface area exceeding 50 m²/g. Component (B) is used in an amount of 10 to 100 parts by weight for every 100 parts by weight of Component (A). If Component (B) is used in an amount of less than 10 parts by weight, the product will be obtained with a reduced mechanical strength, and if the amount exceeds 100 parts by weight, it is difficult to compound Component (B) with Component (A).

Component (C) of the composition is a methyl-substituted benzoyl peroxide, used as a curing agent for thermal curing of the composition. Component (C) is a distinguishing feature of the present composition. In the compositions of this invention, Component (C) comprises grains with a maximum diameter of less than or equal to about 60 $\mu$m, preferably less than or equal to about 50 $\mu$m, and even more preferably, less than or equal to about 40 $\mu$m. The average diameter of the grains in Component (C) is less than or equal to about 30 $\mu$m, and preferably, is less than or equal to about 20 $\mu$m, and even more preferably, is less than or equal to 15 $\mu$m. If the maximum diameter of the grains exceeds about 60 $\mu$m, this will cause either the appearance of voids leading to deviations in physical characteristics of the product formed from the silicone rubber, or will increase the frequency of spark-outs in the insulated electric wires. If the average diameter of particles exceeds about 30 μm, this will reduce the voltage required for insulation breakdown in the insulated wires. The aforementioned maximum and average diameters of grains are determined in accordance with a method for testing grains as specified by item 4.4 of JIS K 5400 (Japanese Industrial Standard) for coating materials. The following are examples of compounds suitable for use as Component (C): bis(ortho-methylbenzoyl) peroxide, bis (meta-methylbenzoyl) peroxide, bis(para-methylbenzoyl) peroxide, or a similar monomethylbenzoyl peroxide, bis(2, 4-dimethylbenzoyl) peroxide, or a similar dimethylbenzoyl peroxide, bis(2,4,6-trimethylbenzoyl) peroxide, or a similar trimethylbenzoyl peroxide. Component (C) is added in an amount of 0.05 to 10 parts by weight, preferably 0.1 to 5 parts by weight for each 100 parts by weight of Component (A).

Although the present composition is a silicone rubber composition consisting of Components (A) through (C), it may be combined with various conventional additives used in conjunction with known silicone rubber compositions, provided that these additives are used in quantities which do not interfere with achieving objectives of the present invention. Such additives may include hexaorganodisilazane, organohydroxysilane, a diorganosiloxane oligomer having both molecular terminals capped with silanol groups, or a similar crepe hardening inhibitor; diatomaceous earth, quartz powder, calcium carbonate, carbon black, or a similar inorganic filler; cerium silanolate, cerium fatty acid salt, or a similar heat-resistant agent; a mold-release agents such as stearic acid, zinc stearate, calcium stearate, or a similar fatty acid or its metal salt, a pigment, a foaming agent, a flame retarder, or a conductivity imparting agent.

The present composition can be easily prepared by uniformly mixing Components (A) through (C). Alternatively, the present composition can be prepared by first preparing a silicone-rubber base compound by uniformly heating and kneading Components (A) and (B) in a two-axis continuous kneader-extruder, or a similar mixer, and then adding (C) component to the obtained silicone rubber compound by means of a two-roller kneader, or similar kneading means.

In manufacturing products formed from a silicone rubber with the use of the present composition, the composition is continuously loaded into an extruder, is formed into an uncured silicone rubber product, and is then subjected to thermal curing under normal pressure. An extruder suitable for this purpose can be any known extruder used for extruding silicone rubber compositions. The curing temperature for thermally curing the silicone rubber composition should be within a range of 200 to 500° C.

The present composition is essentially free of deviations caused in the physical properties of extruded silicone-rubber products by voids and is not subject to spark-outs in the insulated wires or to a decrease in the voltage that results in insulation breakdown. This makes the present composition suitable for manufacturing tubes, tapes, sheets, wire insulation coatings, or similar extruded products which require properties inherent in the composition of the invention.

EXAMPLES

The invention will be further described with reference to practical and comparative examples. In these examples, all parts are parts by weight, and the values of tensile strength are values measured in accordance with the provisions of JIS K 6251 for testing vulcanized rubbers.

Furthermore, the maximum grain diameter and an average grain diameter of a methyl-substituted benzoyl peroxide was measured by the methods described below. The maximum grain diameter and an average grain diameter of a methyl-substituted benzoyl peroxide were measured by a granule measurement procedure in accordance with Item 4.4. of JIS K 5400 that specifies a method for testing coating materials. Measurements were carried out with the use of a fineness gauge.

A polydimethylsiloxane oil paste of methyl-substituted benzoyl peroxide was prepared by uniformly mixing 50 parts by weight of a uniformly kneaded methyl-substituted benzoyl peroxide and 50 parts by weight of a polydimethylsiloxane oil having both molecular terminals capped with trimethylsiloxy groups and a viscosity of 100 centipoise at 25° C. The polydimethylsiloxane oil paste of methyl-substituted benzoyl peroxide (hereinafter referred to as "test material") was applied onto the surface of a fineness gauge, having a number of grooves in an amount in excess for filling the grooves. The material was then spread over the fineness gauge surface with a scraper arranged perpendicularly to the gauge surface and moved with uniform speed within 1 s, starting from division 0. The measurement value was determined by the number of lines which appeared on the basis of Method B of JIS K 5400. More specifically, the maximum division of the gauge on which a first line appeared corresponded to the maximum grain diameter of the test material. A division on which more than three sequential lines appeared corresponded to an average grain diameter. For each test material, the maximum and average grain diameters were determined as the average value of five measurements.

Reference Example 1

A 50 wt % silicone oil paste of bis(para-methylbenzoyl) peroxide oil paste (hereinafter referred to as a Vulcanization Agent A) of bis(para-methylbenzoyl) peroxide was prepared by mixing 50 parts by weight of a bis(para-methylbenzoyl) peroxide powder having coarse particles with a maximum grain diameter exceeding 100 μm and an average grain diameter exceeding 30 μm and 50 parts by weight of a polydimethylsiloxane oil having both molecular terminals capped with trimethylsiloxy groups and a viscosity of 12,000 mPa·s at 25° C. The silicone oil paste was passed through a 3-roller system continuously until the maximum grain diameter in the treated powder did not exceed 40 μm. The 50 wt % silicone oil paste (hereinafter referred to as Vulcanization Agent B) of bis(para-methylbenzoyl) peroxide had the maximum grain diameter of 40 μm and an average grain diameter of 15 μm.

Reference Example 2

A 50 wt % silicone oil paste of bis(para-methylbenzoyl) peroxide oil paste of bis(para-methylbenzoyl) peroxide was prepared by mixing 50 parts by weight of a bis(para-methylbenzoyl) peroxide powder having coarse particles with the maximum grain diameter exceeding 100 μm and an average grain diameter exceeding 30 μm and 50 parts by weight of a polydimethylsiloxane oil having both molecular terminals capped with trimethylsiloxy groups and a viscosity of 12,000 centipoise at 25° C. The obtained silicone oil paste was passed through a 3-roller system continuously until the maximum grain diameter in the treated powder did not exceed 40 μm. The 50 wt % silicone oil paste (hereinafter referred to as Vulcanization Agent C) of bis(para-methylbenzoyl) peroxide had the maximum grain diameter of 50 μm and an average grain diameter of 35 μm.

Practical Example 1

A kneader-mixer was loaded with the following components: with 100 parts of an polyorganosiloxane gum (degree of polymerization of 5,000) having both molecular terminals capped with dimethylvinylsiloxy groups and consisting of 99.6 mole % of dimethylsiloxane units and 0.4 mole % of methylvinylsiloxane units; 11.0 parts of a dimethylsiloxane oligomer rubber having both molecular terminals capped with silanol groups having a viscosity of 60 centipoise at 25° C.; and 45 parts of fumed silica having a specific surface area of 200 $m^2/g$. The components were kneaded with heating to a homogeneous state, whereby a silicone rubber base compound was prepared. A silicone rubber composition was then prepared by combining the obtained silicone rubber base compound with Vulcanization Agent B obtained in Reference Example 1 and added with heating and kneading via a 2-roller system in an amount of 1.5 parts against 100 parts of the aforementioned silicone rubber base compound.

The obtained silicone rubber composition was loaded into a 65-mm diameter single-screw extruder and extruded into a sheet-like product. The obtained sheet-like product was passed through a heating furnace for 60 s at a temperature of 400° C. As a result, an extruded silicone rubber sheet having a width of 100 mm and a thickness of 2 mm was produced. Six dumb-bell samples No. 3 were stamped out from the obtained silicone rubber sheet. These 6 dumb-bell sample were used for measuring the tensile strength of the material. The results of measurements are shown in Table 1.

Comparative Example 1

A silicone rubber composition was prepared by the same method as in Practical Example 1, with the exception that the Vulcanization Agent B obtained in Reference Example 1 was replaced by Vulcanization Agent A. The tensile strength of the silicone rubber composition was measured by the same method as in Practical Example 1. The results of measurements are shown in Table 1.

TABLE 1

| No. of Dumb-Bell Sample No. 3 | Practical Example 1 Tensile Strength (MPa) | Comparative Example 1 Tensile Strength (MPa) |
| --- | --- | --- |
| 1 | 10.1 | 8.1 |
| 2 | 10.1 | 9.3 |
| 3 | 10.0 | 7.2 |
| 4 | 10.0 | 7.7 |
| 5 | 10.1 | 8.7 |
| 6 | 10.3 | 7.2 |
|  | Mean Value 10.1 | Mean Value 8.0 |

Practical Example 2

A kneader-mixer was loaded with the following components: 100 parts of an polyorganosiloxane gum (the degree of polymerization was equal to 5,000) having both molecular terminals capped with dimethylvinylsiloxy groups and consisting of 99.6 mole % of dimethylsiloxane units and 0.4 mole % of methylvinylsiloxane units; 11.0 parts of a dimethylsiloxane oligomer rubber having both molecular terminals capped with silanol groups having a viscosity of 60 centipoise at 25° C.; and 45 parts of fumed silica having a specific surface area of 200 $m^2/g$. The components were kneaded with heating to a homogeneous state. After cooling, the mixture was combined and kneaded with 8.0 parts of a diatomaceous earth, 0.8 parts of a cerium oxide powder, and 1.0 part of a zinc oxide powder, whereby a silicone rubber base compound was prepared. A silicone rubber composition was then prepared by combining the obtained silicone rubber base compound with Vulcanization Agent B obtained in Reference Example 1 and added with heating and kneading via a 2-roller system in an amount of 1.3 parts against 100 parts of the silicone rubber base compound.

The silicone rubber composition was loaded into a 65-mm diameter single-screw extruder and used for the manufacture of an electric wire coated with a silicone rubber composition by applying the composition onto a 0.7-mm diameter core in an extruder cross-head. The obtained wire coated with the silicone rubber composition was passed through a heating furnace for 60 sec at a temperature of 400° C. As a result, a wire coated with a silicone rubber coating having a coating thickness of 0.8 mm was produced. The wire was passed through a spark tester installed between the heating furnace exit and a wire winding drum. Not even a single spark-out occurred after passing 50000 m of the wire at a voltage of 6 kV through the tester.

Comparative Example 2

A silicone rubber composition was prepared by the same method as in Practical Example 2, with the exception that Vulcanization Agent B was replaced by Vulcanization Agent C obtained in Reference Example 2. An electric wire coated silicone rubber was produced with the use of the obtained silicone rubber composition by the same method as in Practical Example 2. Testing of the obtained insulated wire with regard to sparking showed that 25 spark-outs were registered on 50000 m of the wire.

Practical Example 3

Insulation breakdown strength of the electric wires coated with the silicone rubber produced in Practical Example 2 was measured. Measurements were carried out in 5 places (points) on the wire. The results of the measurements are shown in Table 2.

Comparative Example 3

A silicone rubber composition was prepared by the same method as in Practical Example 2, with the exception that Vulcanization Agent B was replaced by Vulcanization Agent C obtained in Reference Example 2. An electric wire coated silicone rubber was produced with the use of the obtained silicone rubber composition by the same method as in Practical Example 3. The insulated wire was tested with regard to the insulation breakdown strength. The results of the measurements are shown in Table 2.

TABLE 2

| Measurement Point | Practical Example 3 Insulation Breakdown Voltage (KV) | Comparative Example 3 Insulation Breakdown Voltage (KV) |
| --- | --- | --- |
| 1 | 13.4 | 9.1 |
| 2 | 13.2 | 7.6 |
| 3 | 12.9 | 9.4 |
| 4 | 14.1 | 8.8 |
| 5 | 13.6 | 9.6 |
|  | Mean Value 13.4 | Mean value 8.9 |

We claim:
1. A curable composition comprising;
    (A) 100 parts by weight of a polyorganosiloxane gum;
    (B) 10 to 100 parts by weight of microparticulate silica;

(C) 0.05 to 10 parts by weight of a methyl-substituted benzoylperoxide having an average grain diameter of less than or equal to about 30 μm and a maximum grain diameter of less than or equal to about 60 μm.

2. The composition of claim 1 where Component (A) has a viscosity greater than about 1×10$^6$ mPa·s at 25° C.

3. The composition of claim 1 where Component (A) comprises about 99.6 mole percent of dimethylsiloxane units and about 0.4 mole percent of methylvinylsiloxane units.

4. The composition of claim 1 where the microparticulate silica is treated with a hydrophobic treatment selected from the group consisting of organochlorosilanes, hexaorganodisilazanes, and diorganocyclopolysiloxanes.

5. The composition of claim 1 where the methyl-substituted benzoylperoxide has an average grain diameter of less than or equal to about 20.

6. The composition of claim 1 where the methyl-substituted benzoylperoxide has an average grain diameter of less than or equal to about 15.

7. The composition of claim 1 where the methyl-substituted benzoylperoxide has a maximum grain diameter of less than or equal to about 50.

8. The composition of claim 1 where the methyl-substituted benzoylperoxide has a maximum grain diameter of less than or equal to about 40.

9. The composition of claim 1 where the methyl-substituted benzoylperoxide is selected from the group consisting of monomethylbenzoyl peroxides such as bis (ortho-methylbenzoyl) peroxide, bis(meta-methylbenzoyl) peroxide, bis(para-methylbenzoyl) peroxide; dimethylbenzoyl peroxide such as bis(2,4-dimethylbenzoyl) peroxide; and trimethylbenzoyl peroxides such as bis(2,4,6-trimethylbenzoyl) peroxide.

10. The composition of claim 1 where the methyl-substituted benzoylperoxide is added at 0.1 to 5 parts by weight per 100 parts by weight of Component (A).

11. The composition of claim 1 further comprising (D) a polydimethylsiloxane oil.

12. A method of making a curable silicone rubber composition comprising the steps of;
  (1) mixing together (A) 100 parts by weight of a polyorganosiloxane gum and (B) 10 to 100 parts by weight of microparticulate silica to form a silicone rubber base;
  (2) mixing together (C') methyl substituted benzoyl peroxide having an average grain size greater than about 30 μm and a maximum grain size greater than about 60 μm with a polydimethylsiloxane oil to form a paste;
  (3) passing the paste through 3-roller system to reduce the grain size of Component (C') to an average grain size of less than or equal to about 30 μm and an maximum grain size of less than or equal to about 60 μm; and
  (4) mixing the paste from Step (3) with the silicone rubber base of Step (1).

13. A method of improving the electrical insulation properties of a curable silicone rubber comprising 100 parts by weight of a polyorgaonsiloxane gum and 10 to 100 parts by weight of microparticulate silica, the method comprising adding 0.05 to 10 parts by weight of a methyl-substituted benzoyl peroxide having an average diameter of particles less than or equal to about 30 μm and a maximum diameter of particles less than or equal to about 60 μm.

* * * * *